(12) United States Patent
Wascheul et al.

(10) Patent No.: US 9,829,051 B2
(45) Date of Patent: Nov. 28, 2017

(54) GEARBOX SYNCHROMESH, WITH A SPLINED FLANGE FOR THE TRANSLATIONAL MOVEMENT OF THE HUB

(71) Applicant: Technoboost, Paris (FR)

(72) Inventors: Michael Wascheul, Acheres (FR); Aurelien Renault, Jouars Pontchartrain (FR); Marc Giannoni, Paris (FR)

(73) Assignee: TECHNOBOOST, Paris (FR)

( * ) Notice: Subject to any disclaimer, the term of this patent is extended or adjusted under 35 U.S.C. 154(b) by 0 days.

(21) Appl. No.: 15/321,013

(22) PCT Filed: Jun. 24, 2015

(86) PCT No.: PCT/FR2015/051691
§ 371 (c)(1),
(2) Date: Dec. 21, 2016

(87) PCT Pub. No.: WO2016/001527
PCT Pub. Date: Jul. 1, 2016

(65) Prior Publication Data
US 2017/0152901 A1    Jun. 1, 2017

(30) Foreign Application Priority Data

Jul. 1, 2014    (FR) ..................... 14 56251

(51) Int. Cl.
*F16D 11/00*        (2006.01)
*F16D 13/00*        (2006.01)
(Continued)

(52) U.S. Cl.
CPC ............ *F16D 23/06* (2013.01); *F16H 3/091* (2013.01); *F16D 2023/0631* (2013.01); *F16D 2023/0637* (2013.01)

(58) Field of Classification Search
CPC ............ F16H 61/0403; F16H 2306/48; F16D 23/025; F16D 23/06; F16D 23/08
(Continued)

(56) References Cited

U.S. PATENT DOCUMENTS 2,443,597 A     6/1948  Carnagua et al.
4,811,825 A *   3/1989  Christian ................ F16D 23/06
                                                192/53.32
(Continued)

FOREIGN PATENT DOCUMENTS

FR          1082228 A      12/1954
FR          2884881 A1     10/2006

OTHER PUBLICATIONS

International Search Report from Corresponding International Appln No. PCT/FR2015/051691 dated Nov. 4, 2015.
(Continued)

*Primary Examiner* — Ha D Ho
(74) *Attorney, Agent, or Firm* — Polster, Lieder, Woodruff & Lucchesi, LC

(57) ABSTRACT

A gearbox (BV) comprises a secondary shaft (AS) provided with a synchromesh (SB) comprising a flange (FL) comprising a sub-hub (SM) fixedly secured to the secondary shaft (AS) and provided with external splines (CE3), a hub (MO) comprising internal splines (CI1) collaborating with the external splines (CE3) of the sub-hub (SM) to allow translational movement with respect to the latter (SM), and a sleeve (MA) that can undergo a translational movement with respect to the hub (MO) so that the internal splines (CI2) thereof are closely coupled to dogs (CR) of an idling pinion (PF1). This translational movement of the hub (MO) with respect to the sub-hub (SM) guarantees close coupling of the internal splines (CI2) of the sleeve (MA) with the dogs (CR) with a minimal margin for translation, irrespective of
(Continued)

dimensional variations in the manufacture of the sleeve (MA) and idling pinion (PF1).

8 Claims, 2 Drawing Sheets

(51) Int. Cl.
  *F16H 3/38* (2006.01)
  *F16D 23/06* (2006.01)
  *F16H 3/091* (2006.01)
(58) Field of Classification Search
  USPC .................. 74/336 R, 339; 192/53.31–53.34
  See application file for complete search history.

(56) References Cited

U.S. PATENT DOCUMENTS

| | | | | |
|---|---|---|---|---|
| 5,678,670 | A * | 10/1997 | Olsson | F16D 23/06 |
| | | | | 192/53.31 |
| 6,543,594 | B1 * | 4/2003 | Fuhrer | F16D 13/683 |
| | | | | 192/53.1 |
| 9,057,440 | B2 * | 6/2015 | Hanai | F16H 57/01 |
| 9,267,550 | B2 * | 2/2016 | Nakamura | F16D 11/00 |

OTHER PUBLICATIONS

Written Opinion from Corresponding International Appln No. PCT/FR2015/051691.

* cited by examiner

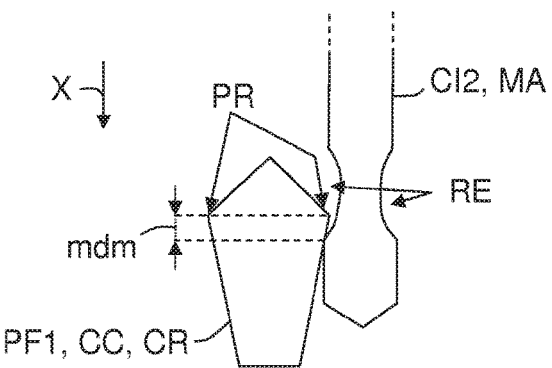
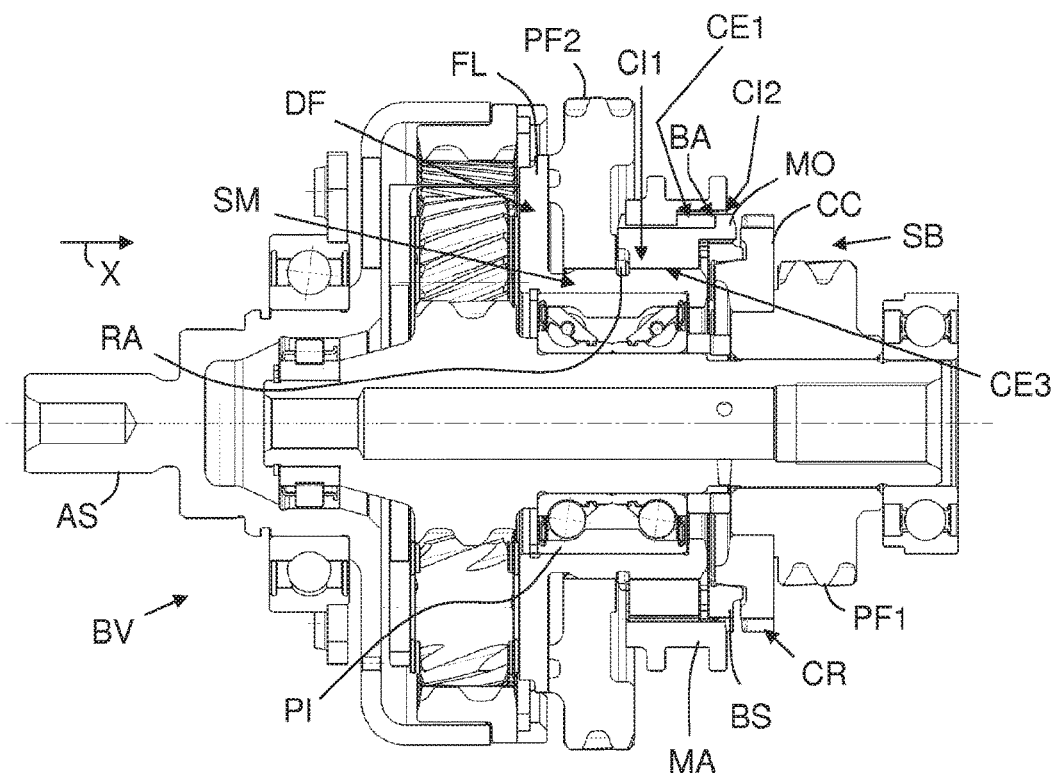
FIG.1
FIG.2

GEARBOX SYNCHROMESH, WITH A SPLINED FLANGE FOR THE TRANSLATIONAL MOVEMENT OF THE HUB

CROSS-REFERENCE TO RELATED APPLICATIONS

This application is the U.S. National Stage of International Application PCT/FR2015/051691 which was filed Jun. 24, 2015, and published as WO2016/001527, which derives priority from French App. No. 1456251 filed Jul. 1, 2014 and which are hereby incorporated by reference.

BACKGROUND

The invention relates to gearboxes which equip particular systems, such as, for example, particular vehicles, possibly of the automotive type, and more precisely the synchronizers these gearboxes comprise.

As is known to those skilled in the art, a gearbox generally comprises at least one primary shaft, at least one secondary shaft, at least one synchronizer, at least one fork associated with one synchronizer, and at least one fork actuator. Each primary shaft and the associated secondary shaft are respectively provided with fixed pinions and idling pinions intended to define ratios (or speeds) together.

Each actuator is responsible for moving a fork so as to induce a displacement of a part of a synchronizer, partly translatable on a secondary shaft, in order to cause the secondary shaft to be coupled in rotation with the associated primary shaft, via an idling pinion of this secondary shaft.

For example, each synchronizer may comprise at least:
  one hub secured in rotation to the secondary shaft by internal splines co-operating with external splines of this secondary shaft,
  one sleeve (or sliding gear) mounted in translation on the hub,
  one synchronizing ring comprising a female conical portion capable of being coupled to a male conical portion of a dog gear of an idling pinion, and
  one arming mechanism installed between an inner face of the sleeve and an outer face of the hub, and for translating the synchronizing ring for coupling it to the dog gear of the idling pinion when the sleeve is translated by the associated fork.

Each sleeve is capable of being translated, after angularly shifting the associated synchronizing ring during a phase generally known as "backspin," so as to be coupled, during a phase generally known as "clutching", to the idling pinion which has been previously synchronized by the synchronizing ring during a phase generally known as "synchronization". The coupling of a synchronizing ring to an idling gear is intended to synchronize the speed of rotation of the idling gear with the speed of the secondary shaft which carries it, and the coupling of a sleeve to this same idling gear is intended to temporarily rotationally secure this idling gear to the secondary shaft which carries it.

Each actuator comprises a cam, the rotation of which causes the translation of a fork, and thus of the sleeve of a synchronizer. This cam has a height which must make it possible to systematically ensure the passage of a ratio (or speed) without jamming before the end of the stroke. This height depends directly on the stroke of the sleeve and must be adjusted as best possible to ensure a margin of minimum distance (or translation) mdm in grip.

As shown in FIG. 1, the aforesaid (mdm) is predefined in such a way that a narrow coupling of the inner splines CI2 of the sleeve MA at the dogs CR of the dog gears CC of the idling pinion PF1 can occur, taking into account the dimensional variations in the manufacture of the sleeve MA, the synchromesh ring and the idling gear PF1. More precisely, the inner splines CI2 of the sleeve MA comprise end teeth, comprised of so-called "anti-release" indents RE, in which there are to be housed protuberances PR, defined at the intersection between dihedrons constituting the dogs CR of the dog gear, in order to ensure the effective engagement of the idling pinion PF1. The margin of minimal distance (or translation) MDM in grip is then defined as the minimum distance between the front end of an anti-release indents RE and the intersection of the dihedrons, when the ratio is engaged and the sleeve MA has covered the dog gear CC.

The cam height depends on the gearbox design and the synchronizers to be driven (number of cones, angularity of the teeth ends or dogs). Consequently, for the same actuator ramp to control all the synchronizers, the determination of the dimension chains proves to be complex in order to avoid drag and "heat" problems of the synchronizers. It is to be recalled that the phenomena of drag of the gearbox is controlled when the dimension chains of the idling gear play is typically between approximately 0.06 mm and 0.3 mm.

It is therefore difficult to manage the height of this cam for gearboxes which are mass produced, for example for passenger cars, mainly because of tight manufacturing dimensional tolerances and harmonization of the chains of dimensions of the synchronizers to be driven. Indeed, if it is possible to accomplish precise pairing of the forks by machining or by fitting with shims for a competition gearbox, it becomes impossible to achieve for a standard gearbox, due to the costs, the control time and the accuracy of the metrology.

It will be noted that this operation is all the more difficult to achieve when the dimensions of the gearboxes are reduced in order to make them more compact.

SUMMARY

The object of the invention is therefore in particular to improve the situation.

It proposes for this purpose, in particular, a synchronizer intended to equip a gearbox, comprising at least one secondary shaft, and comprising a hub rotationally coupled to this secondary shaft, and a sleeve comprising internal splines and capable of being translated with respect to this hub, so that its internal splines are tightly coupled to dogs of an idler pinion, participating in the definition of at least one ratio.

This synchronizer is characterized by the fact that:
  it also comprises a flange comprised of a sub-hub, fixedly secured to its secondary shaft and provided with external splines, and
  that its hub comprises internal splines, capable of cooperating with the external splines of the sub-hub, to allow a translation with respect to the sub-hub which is capable of ensuring the close coupling of the internal splines of the sleeve to the dogs, with a minimum translational margin, regardless of dimensional manufacturing variations of the sleeve and of the idling pinion.

Due to the translational play provided by the sliding splined connection between the hub and the sub-hub, the hub can be clamped efficiently on the part of the idling pinion, which includes the dogs, without risk of escape and avoiding the blocking or jamming of the finger of the fork in the actuator.

The synchronizer, according to the invention, can have other characteristics which can be taken separately or in combination and in particular:
- the flange can be fixedly secured to its secondary shaft via an intermediate piece;
- the hub may comprise at least one stop capable of preventing the translation of the associated sleeve with respect to it over a distance which is greater than a predefined value;
- the flange may comprise a disc fixedly secured to one end of the sub-hub, substantially at 90°. In this case, it may also comprise a fixed pinion mounted on its sub-hub between the disk and the hub, and secured in rotation to this sub-hub;
  - it may also comprise an abutment washer placed at one end of its hub which is oriented towards the fixed pinion and capable of acting as an interface between its hub and this fixed pinion.

The invention also proposes a gearbox comprising at least one secondary shaft, to which at least one synchronizer of the type described above is coupled.

The invention also proposes a vehicle, possibly of the automotive type, and comprising a gearbox of the type described above.

DESCRIPTION OF THE FIGURES

Other features and advantages of the invention will appear upon examining the description detailed hereinafter, and the accompanying drawings, in which:

FIG. 1 schematically illustrates the close cooperation between an end tooth of an internal spline of a sleeve, and a dog of a dog gear of an idler pinion of a gearbox, FIG. 2 schematically illustrates, in a longitudinal sectional view, a part of a secondary axis of a gearbox to which is secured an exemplary embodiment of a synchronizer according to the invention and an idler pinion, FIG. 3 schematically illustrates, in a perspective view, certain elements of the synchronizer of FIG. 2 and a dog gear, before assembly on a secondary axis, and FIG. 4 schematically illustrates, in a perspective view, the synchronizer elements of FIG. 3 assembled together and coupled to a idler pinion.

DESCRIPTION

Figure 3:
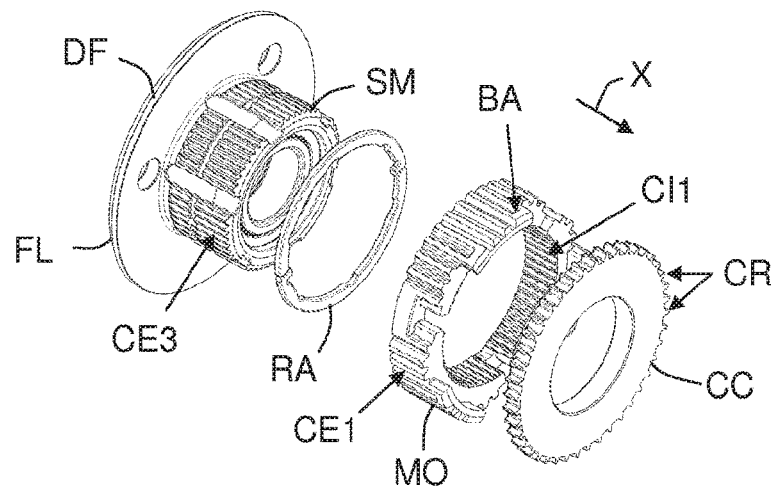

The invention notably has as its object to propose a synchronizer SB, intended to equip a gearbox BV, comprising at least one secondary shaft AS.

In the following, by way of non-limiting example, it is considered that the gearbox BV is intended to be fitted to an automotive vehicle, such as, for example, a car. However, a gearbox BV according to the invention can equip any type of system, in particular land vehicles (of whatever type), maritime (or fluvial) vehicles and certain installations, possibly industrial.

In FIGS. 1 to 4, the direction X is a so-called longitudinal direction of translation.

A very small part of a gearbox BV, is shown schematically in FIG. 2, here intended to be coupled to an internal combustion engine of a vehicle via a clutch.

Although this appears very partially in FIG. 2, the gearbox BV comprises, conventionally and in particular in this case, at least one primary shaft, at least one secondary shaft AS, at least one synchronizer SB, at least one fork associated with a synchronizer SB, and at least one fork actuator.

It is considered in the following, by way of non-limiting example, that the gearbox BV is coupled to a simple clutch. Consequently, it comprises only one primary shaft and one secondary shaft AS. But this gearbox BV could be dual clutch (or DCT).

The primary shaft constitutes the input of the gearbox BV. It is designed to receive the engine torque via the clutch and comprises several fixed pinions intended to be involved in the definition of the ratios (or speeds) of the gearbox BV.

The secondary shaft AS constitutes the output of the gearbox BV. It is intended to receive the engine torque via the primary shaft in order to communicate it to a transmission shaft to which it is coupled, and for this purpose comprises several idling pinions engaging certain fixed pinions of the primary shaft, defining different ratios (or speeds) of the gearbox BV. It is recalled that when one wishes to engage a gear ratio, an idling pinion must be temporarily rotationally secured to the secondary shaft carrying the idling pinion.

This secondary shaft AS comprises at least one synchronizer SB (and generally several (for example three or four) synchronizers), a part of which can be translated in the direction X by a (control) fork when the latter is translated in the direction X by an actuator. It will be noted that an actuator can move one or more forks.

According to the invention, each synchronizer SB comprises at least one flange FL, one hub MO, one sleeve AM, one synchronzier ring SB, and one arming mechanism.

As illustrated in FIG. 2, the flange FL comprises a sub-hub SM which is fixedly secured to the secondary shaft AS and which is provided with external splines CE3. This fixed attachment can, for example, be made via an intermediate part PI which is itself fixedly secured to the secondary shaft AS. This intermediate part PI is, for example, a bearing which makes it possible to translationally lock the flange FL, and which ensures the rotation of the fixed pinion PF2 via the external splines CE3 of the sub-hub SM.

The hub MO is coupled in rotation to the secondary shaft AS via the sub-hub SM. As can be seen more clearly in FIGS. 2 and 3, this hub MO comprises more precisely internal splines CI1 adapted to cooperate with the external splines CE3 of the sub-hub SM in order to allow its translation (or its sliding) with respect to this latter, in the direction X.

The sleeve (or sliding gear) MA is capable of being translated with respect to the hub MO in the direction X by the action of the associated fork. For this purpose, it comprises internal splines CI2 intended to cooperate with external splines CE1 of the hub MO, to enable it to be translated until the internal splines CI2 are closely coupled, in a guaranteed manner, to dogs CR of an associated idler pinion PF1, which is involved in the definition of at least one ratio, with a minimum translation margin (or displacement) mdm, independently of manufacturing dimensional variations of at least the sleeve MA and the idler pinion PF1.

It is recalled that the aforementioned close coupling takes place in several phases, which for some of them use a synchronizer ring SB, mounted on the secondary shaft AS, between one part of the sleeve MA, and the dog gear CC, upon which are defined the dogs CR and which is fixedly secured to the idling pinion PF1.

The synchronizer ring SB comprises a female conical part, which is suitable for being coupled to a male conical part of the dog gear CC of the idling pinion PF1 during a synchronizing phase. This latter phase comprises slightly translating the sleeve MA with the associated fork, in order to constrain at least one arming mechanism, which is installed between its internal face and an external face of the hub MO, in order to translate the synchronizer ring SB, to couple the synchronizer ring SB to the dog gear CC of the idling pinion PF1. The coupling of the synchronizer ring SB to the idling pinion PF1 (via its dog gear CC) is intended to synchronize the speed of rotation of this idling pinion PF1 with that of the secondary shaft AS which carries it.

After this phase of synchronization, there occurs a phase generally known as "deviation," during which the translation of the sleeve MA with the associated fork is continued, in order to cause an angular offset of the synchronizer ring SB.

Finally, after this phase of deviation, there occurs a phase generally known as "clutching," during which the translation of the sleeve MA with the associated fork is completed, in order to securely couple its internal splines CI2 to the dogs CR of the dog gear CC of the idling pinion PF1. The coupling of the sleeve MA to the idling pinion PF1 is intended to temporarily secure the idling pinion PF1 to the secondary shaft AS, which carries it.

By "close coupling," it is meant here the fact that certain so-called "anti-release" indents RE of the end teeth of the internal splines CI2 of the sleeve MA, house protuberances PR defined at the intersection between dihedrons constituting the dogs CR of the dog gear CC as illustrated in FIG. 1.

The minimum translation margin (or displacement) mdm is defined as the minimum distance between the front end of an anti-release indent RE, and the intersection of the dihedrons of a dog CR, when the gear is engaged and the sleeve MA has covered the dog gear CC at the end of the clutch phase.

It will be understood that the translational play (along X), provided by the splined sliding connection between the hub MO and the sub-hub SM, makes it possible to press this hub MO effectively onto the dog gear CC, in order to obtain the necessary stroke for the complete engagement of the new gear, without risk of slipping the anti-release, while avoiding blocking or jamming of the finger of the fork in the actuator. Since the variation in end-of-stroke play is erased by the splined sliding connection, the chain of minimum dimensions in engagement is reduced and independent of the dimensional variations in the manufacture of the parts which constitute it (sleeve MA, synchromesh ring SB and dog gear CC of the idling pinion PF1), which makes it possible to easily optimize it, and thus to easily make the parts, with (very) complicated shapes, without having to carry out complementary machining operations.

Figure 4:
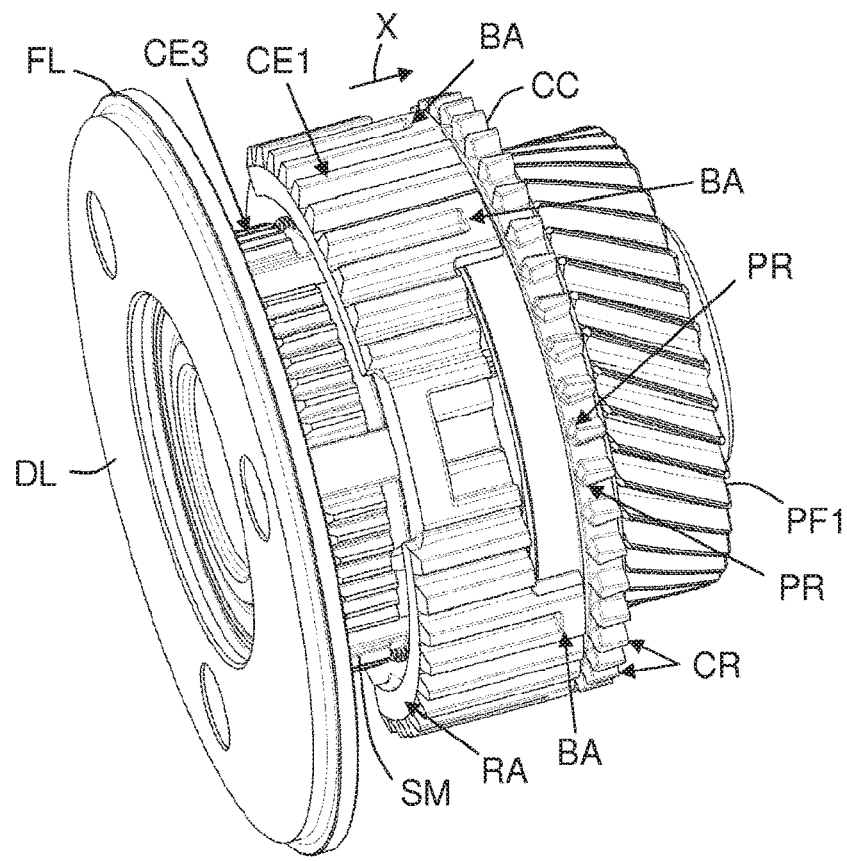

It will be noted, as illustrated in FIGS. 2 to 4, that the hub MO preferably comprises at least one stop BA (and preferably several) suitable for preventing the translation of the sleeve MA relative to the hub, over a distance which is greater than a predefined value. This distance is chosen in such a way as to prevent the sleeve MA from exceeding the dog gear CC in the engagement phase, in order to eliminate any risk of inferences with the teeth of the idling pinion PF1. As illustrated non-limitatively in FIGS. 3 and 4, each stop BA can be defined by a wall joining, substantially perpendicularly, two extended ends of two external splines CE1 close to the hub MO.

It will also be noted, as illustrated non-limitatively in FIGS. 2 and 4, that the flange FL may comprise a disk DF fixedly secured to one end of the sub-hub SM, substantially at 90°. In this case, the synchronizer SB may also comprise a fixed pinion PF2 mounted on the sub-hub SM between the disk DF and the hub MO, and secured in rotation to the sub-hub SM. It will be understood that this disk DF is designed to prevent the translations of the fixed pinion PF2, in a direction that is opposite to the idler pinion PF1. The disk DF can also serve to secure another part which may be part of the synchronizer SB, as illustrated non-limitatively in FIG. 2.

The synchronizer SB can also and optionally comprise an abutment washer or half-washer RA placed at one end of the hub MO, which is oriented towards the fixed pinion PF2, and able to serve as an interface between the hub MO and the fixed pinion PF2, as illustrated non-limitatively in FIG. 2. This abutment washer or half-washer RA serves to lock in translation the fixed pinion PF2.

The invention offers several advantages, including:
- a precise position of the end-of-stroke of the sleeve, because the change in end-of-stroke play is erased by the splined sliding connection,
- a possibility of making the gearboxes more compact,
- an easier realization of the dimension chains,
- an independence vis-à-vis the manufacturers of certain parts, such as, for example, the dog gears, which are non-welded and slidable on splines.

The invention claimed is:

1. A synchronizer for a gearbox comprising at least one secondary shaft, a hub rotationally coupled to said secondary shaft and having internal splines, and a sleeve comprising internal splines and suitable for being translated with respect to said hub so that the internal splines of the hub are closely coupled to dogs of an idling pinion; said hub and sleeve defining at least one ratio of the gearbox, said synchronizer further comprising a flange comprising a sub-hub which is fixedly secured to said secondary shaft and which is provided with external splines; said internal splines of said hub being capable of cooperating with said external splines of said sub-hub to allow translation of said sleeve with respect to the sub-hub and to ensure a narrow coupling of said inner splines of the sleeve to said dogs with a minimum translational margin regardless of dimensional manufacturing variations of said sleeve and idling pinion.

2. The synchronizer according to claim 1, wherein said flange is fixedly secured to the said secondary shaft via an intermediate piece.

3. The synchronizer according to claim 1, wherein said hub comprises at least one stop capable of preventing translation of said sleeve relative to said hub over a distance greater than a predefined value.

4. The synchronizer according to claim 1, wherein said flange comprises a disk fixedly secured to one end of the said sub-hub substantially at 90° thereto, and in that said synchronizer further comprises a fixed pinion mounted on the said sub-hub between said disk and the said hub, and secured in rotation to said sub-hub.

5. The synchronizer according to claim 4, wherein said synchronizer further comprises an abutment washer placed at one end of the said hub, said abutment washer being oriented towards said fixed pinion and capable of acting as an interface between said hub and said fixed pinion.

6. A gearbox comprising at least one secondary shaft and at least one synchronizer according to claim 1, said at least one synchronizer being coupled to said secondary shaft.

7. A vehicle comprising a gearbox according to claim 6.

8. The vehicle according to claim 7, wherein said vehicle is of the automotive type.

* * * * *